United States Patent
Shalf et al.

(10) Patent No.: US 10,078,593 B2
(45) Date of Patent: Sep. 18, 2018

(54) MULTIPLE-CORE COMPUTER PROCESSOR FOR REVERSE TIME MIGRATION

(71) Applicants: THE REGENTS OF THE UNIVERSITY OF CALIFORNIA, Oakland, CA (US); FRAUNHOFER-GESELLSCHAFT ZUR FORDERUNG DER ANGEWANDTEN FORSCHUNG e.V., Munich (DE)

(72) Inventors: John Shalf, Oakland, CA (US); David Donofrio, San Francisco, CA (US); Leonid Oliker, San Francisco, CA (US); Jens Kruger, Ravensburg (DE); Samuel Williams, San Ramon, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 282 days.

(21) Appl. No.: 14/354,502

(22) PCT Filed: Oct. 26, 2012

(86) PCT No.: PCT/US2012/062248
§ 371 (c)(1),
(2) Date: Apr. 25, 2014

(87) PCT Pub. No.: WO2013/063486
PCT Pub. Date: May 2, 2013

(65) Prior Publication Data
US 2014/0310467 A1 Oct. 16, 2014

Related U.S. Application Data

(60) Provisional application No. 61/553,007, filed on Oct. 28, 2011.

(51) Int. Cl.
*G06F 12/08* (2016.01)
*G06F 15/78* (2006.01)
*G06F 12/0842* (2016.01)

(52) U.S. Cl.
CPC ...... *G06F 12/0842* (2013.01); *G06F 15/7825* (2013.01); *Y02D 10/12* (2018.01); *Y02D 10/13* (2018.01)

(58) Field of Classification Search
CPC ............ G06F 12/0842; G06F 15/7825; Y02B 60/1207; Y02B 60/1225
See application file for complete search history.

(56) References Cited

U.S. PATENT DOCUMENTS

2002/0019928 A1* 2/2002 Saulsbury ........... G06F 9/30021
712/222
2006/0248287 A1 11/2006 Buyuktosunoglu et al.
(Continued)

OTHER PUBLICATIONS

Kruger, J-T. (2012) "Green Wave: A Semi-Custom Hardware Architecture for Reverse Time Migration," Dissertation Ruperto-Carola University of Heidelberg, Germany, 224 pages.
(Continued)

*Primary Examiner* — Michael Alsip
(74) *Attorney, Agent, or Firm* — Womble Bond Dickinson (US) LLP; Daniel Ovanezian

(57) ABSTRACT

A multi-core computer processor including a plurality of processor cores interconnected in a Network-on-Chip (NoC) architecture, a plurality of caches, each of the plurality of caches being associated with one and only one of the plurality of processor cores, and a plurality of memories, each of the plurality of memories being associated with a different set of at least one of the plurality of processor cores and each of the plurality of memories being configured to be visible in a global memory address space such that the plurality of memories are visible to two or more of the
(Continued)

plurality of processor cores, wherein at least one of a number of the processor cores, a size of each of the plurality of caches, or a size of each of the plurality of memories is configured for performing a reverse-time-migration (RTM) computation.

22 Claims, 5 Drawing Sheets

(56) References Cited

U.S. PATENT DOCUMENTS

| | | | | |
|---|---|---|---|---|
| 2009/0182944 A1* | 7/2009 | Comparan | ......... | G06F 12/0888 |
| | | | | 711/122 |
| 2010/0088035 A1* | 4/2010 | Etgen | ....................... | G01V 1/30 |
| | | | | 702/16 |
| 2010/0228922 A1 | 9/2010 | Limaye | | |
| 2011/0219208 A1* | 9/2011 | Asaad | ..................... | G06F 15/76 |
| | | | | 712/12 |

OTHER PUBLICATIONS

Donofrio, D. et al. (2009). "Energy-Efficient Computing for Extreme-Scale Science," IEEE Computer Society, 62-70.

Krueger, J. et al. (2011). "Hardware/Software Co-Design for Energy-Efficient Seismic Modeling," Lawrence Berkeley National Laboratory, Computer Science Division, 12 pages.

International Search Report and Written Opinion for PCT Patent Application No. PCT/US2012/062248, filed Oct. 26, 2012, 10 pages.

* cited by examiner

MULTIPLE-CORE COMPUTER PROCESSOR FOR REVERSE TIME MIGRATION

RELATED APPLICATIONS

This application claims priority to U.S. Provisional Patent App. No. 61/553,007 filed Oct. 28, 2011, which is hereby incorporated by reference in its entirety.

STATEMENT OF GOVERNMENT SUPPORT

This invention was made with government support under Contract No. DE-AC02-05CH11231 awarded by the U.S. Department of Energy. The government has certain rights in this invention.

FIELD

The present invention relates to the field of computer processors, and particularly relates to a computer processor to perform reverse-time-migration (RTM).

BACKGROUND

Power consumption is a limiting factor for high-performance computing (HPC) system performance. In the area of seismic image processing, the Reverse Time Migration (RTM) method consumes enormous HPC resources that consume many megawatts of power over many weeks to process seismic survey data.

DETAILED DESCRIPTION

A scalable architecture for a multiple-core computer processor is described. In particular, in one embodiment, an approach to inter-processor communication is described that is scalable to large tiled chip designs.

In one embodiment, an energy efficient approach to parallel chip architecture is described that could be used for everything from embedded and consumer electronics applications such as cell-phones, digital signal processors, all the way up to large-scale applications such as cloud computing and energy efficient high-performance computing (HPC) systems. Various approaches to parallel computing chip architecture are described that are cost effective, scalable, programmable, or a combination of these features.

Figure 1:
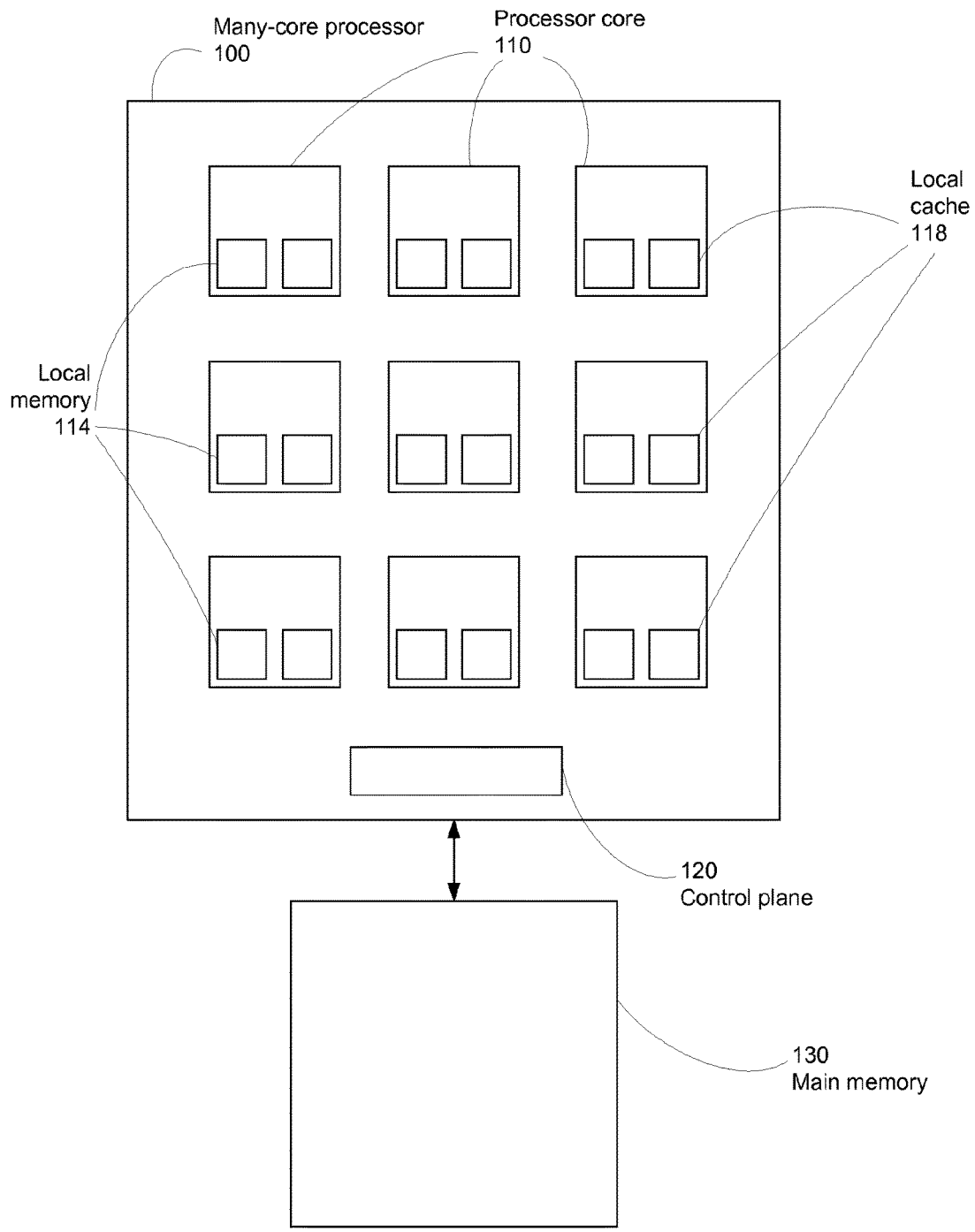
FIG. 1 is a system block diagram of an embodiment of a multiple-core processor.

FIG. 1 is a system block diagram of an embodiment of a multiple-core processor 100. The processor 100 may include one or more processing devices, such as one or more central processing units (CPUs), microcontrollers, field programmable gate arrays or other types of processing devices. The multiple-core processor 100 includes a plurality of processor cores 110 and is, therefore, a multi-core or a many-core processor. In one embodiment, the processor cores 110 are fully general purpose. In another embodiment, the processor cores 110 are designed to favor computational efficiency over serial (per-core) peak performance.

In one embodiment, the processor cores 110 are Tensilica LX2 cores (produced by Tensilica, Inc., of Santa Clara, Calif.) which comprise in-order single-issue core+4-slot SIMD (Single Instruction, Multiple Data) FPU (floating-point unit) capable of 8 GFLOP/s (giga-floating point operations per sec) at 1 GHz (gigahertz) @ 40 mW (milliwatts). Alternatively, other types of processor cores may be used.

The processor cores 110 are interconnected via a Network-on-Chip (NoC) architecture. The NoC connects the processor cores 100 to each other to enable inter-processor communication and memory addressing, and may also connect to off-chip services such as I/O (input/output) and memory controllers. In one embodiment, the processor cores 110 are connected to the NoC in a scalable "tiled" fashion so that each tile contains a processor core 110, its associated memory (or memories), and an associated portion of the NoC. This enables the number of processor cores 110 on chip to be scaled up flexibly. Each tile may include additional (or fewer) components. For example, in one embodiment, one or more tiles may not include a memory or cache.

Network-on-Chip (NoC) is an architecture for communications between components implemented on a single chip, e.g. a silicon chip or other common carrier substrate. In one embodiment, the architecture employs a layered-stack approach to the design of the on-chip intercore communications. In an embodiment of an NoC system, modules such as processor cores, memories and specialized IP blocks exchange data using a network as a public transportation sub-system for the information traffic. The interconnections are constructed from multiple point-to-point data links interconnected by switches or routers, allowing messages to be relayed from any source module to any destination module over several links by making routing decisions at the switches.

The processor cores 110 are interconnected via one or more data buses. In one embodiment, the processor cores 110 are connected in a mesh or grid topology. In another embodiment, the processor cores 110 are connected in a torus or ring topology. The processor cores 110 may be interconnected using other topologies, architectures, design schemes, paradigms, or in other ways.

Each of the processor cores 110 includes a local memory 114 and a local cache 118. In one embodiment, the local memory 114 is software-controlled (e.g., software-managed) memory and the local cache 110 is automatically-controlled (e.g., automatically-managed). For example, the software-controlled local memories 114 can be used to explicitly manage locality when desired and the automatically-controlled local caches 110 can be used for convenience for non-performance-critical data, and to help with incremental porting. Thus, the multiple-core processor 100 may provide the energy-efficiency benefits of software-controlled memory together with the ease-of-use of auto-matic-controlled caches. The multiple-core processor 100 includes mechanisms to maintain consistency between the local memories 114 and local caches 110.

The local memories 114 or local caches 110 may be implemented in a multi-level cache system. In one embodiment, the multi-level cache system operate by checking the smallest level 1 (L1) cache first; if it hits, the processor proceeds at high speed. If the smaller cache misses, the next larger cache (L2) is checked, and so on, before external memory is checked. In one embodiment, the local memory 114 is an L1 memory. In one embodiment, the local memory 114 is a scratch pad memory. In particular, in one embodiment, the local memory 114 is an L1 scratch pad memory. Each of the local memories 114 (or at least one or more of the local memories 114) is configured to be able to address any other local memory 114 (or at least one or more of the other local memories 114), for example, via an asynchronous direct memory access (DMA) mechanism that allows a data copy to be transmitted directly from one local memory 114 to another local memory 114. As noted above, in one embodiment, the local memory 114 is a scratch pad memory, thus the DMA mechanism allows direct scratchpad-to-scratchpad data copies. Each of the local memories 114 is located in a different location. Thus, each of the local memories 114 is a distance away from any other location, e.g. the location of a particular processor core 110. Different local memories 114 are different distances from a particular processor core 110. For example, a local memory 114 of a first processor core may be 0 distance from the first processor core, whereas a local memory of a second processor core different from the first processor core may be X distance from the processor core, where X is greater than 0.

In one embodiment, the local cache 118 is an L1 cache. In one embodiment, the local caches 118 are coherent. In another embodiment, the local caches 118 are not coherent. The local caches 118 can be part of a coherence domain. Each local cache 118 (or at least one or more of the local caches 118) includes an instruction cache and a data cache. In one embodiment, the local caches 118 are configured to support incremental porting of existing code.

The multiple-core processor 100 may be coupled to a main memory 130 external to the multiple-core processor 130 or may include a main memory 130 internal to the multiple-core processor 130. In one embodiment, each of the local memories 114 (or at least one or more of the local memories 114) is configured to be able to address the main memory 130. In one embodiment, the local memories 114 are configured to address the main memory 130 via an asynchronous direct memory access (DMA) mechanism via an asynchronous direct memory access (DMA) mechanism that allows a data copy to be transmitted directly from the local memory 114 to the main memory 130.

Thus, in one embodiment, each of processor cores 110 (or at least one or more of the processor cores 110) is configured to be able to address any of local memories 114 (or at least one or more of the local memories 114 besides it own). In particular, each processor core 110 (or at least one or more of the processor codes 110) contains a local memory 114 configured to be visible in a global memory address space of the multiple-core processor 100 so that it is visible to all other processor cores 110 (or at least one or more of the other processor cores 110) of the multiple-core processor 100.

In one embodiment, each of the processor cores 110 (or at least one or more of the processor cores 110) is configured to be able to address the main memory 130. The main memory 10 is addressed via the local cache 118 of the processor core 110.

The local memories 114, local caches 118, and main memory 130 may include any combination of volatile and/or non-volatile storage devices. They may also be one or more types of removable storage and/or one or more types of non-removable storage. They may include one or more of read-only memory (ROM), flash memory, dynamic random access memory (DRAM) such as synchronous DRAM (SDRAM) or static random access memory (SRAM). The local memories 114, local caches 118, and main memory may be other forms of memory or storage.

The multiple-core processor 100 includes a control plane 120. In one embodiment, the control plane 120 is an independent control plane. In one embodiment, the control plane 120 is a separate/dedicated control plane 120. The control plane 120 includes direct message queues between the processor cores 110 and is configured to perform synchronization in the multiple-core processor 100. The control plane 120 may be configured to enforce memory consistency between scratch pad memories. The use of a separate, independent control plane may improve scalability of the design and further improve energy efficiency.

In one embodiment, the processor cores 110 (including the local memories 114 and local caches 118) reside on a common carrier substrate, such as, for example, an integrated circuit ("IC") die substrate, a multi-chip module substrate, or the like. The main memory 130 may reside on the same common carrier substrate or a different substrate. The multiple-core processor 100 and main memory 130 reside on one or more printed circuit boards, such as, for example, a mother board, a daughter board or other type of circuit card.

Figure 2:
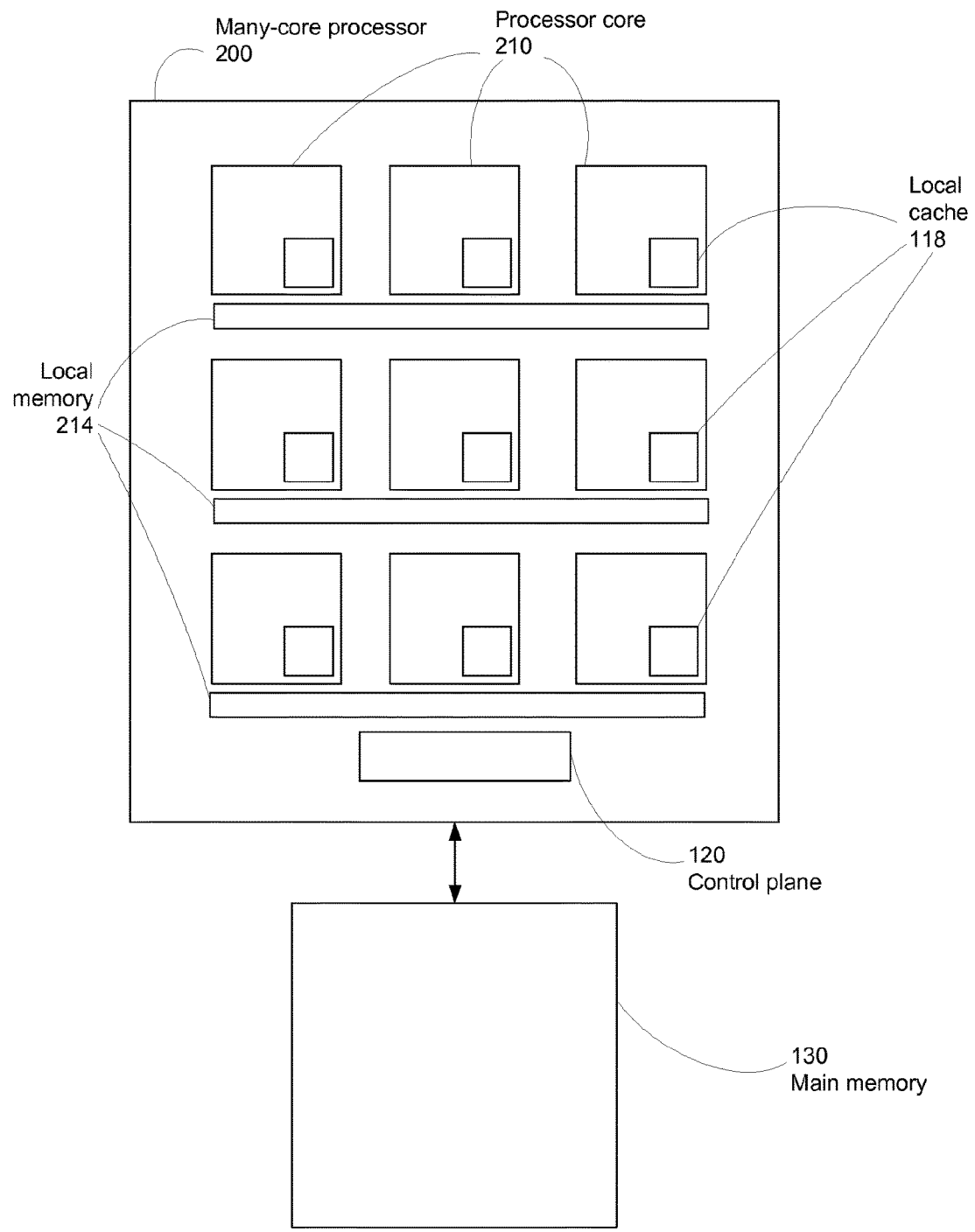
FIG. 2 is a system block diagram of another embodiment of a multiple-core processor.

FIG. 2 is a system block diagram of another embodiment of a multiple-core processor 200. The multiple-core processor 200 of FIG. 2 is substantially similar to the multiple-core processor 200 of FIG. 1 except that each of the processor cores 210 in FIG. 2 do not include a local memory 114 as the processor cores 110 in FIG. 1 do. Rather, the multiple-core processor 200 includes a plurality of local memories 214, each associated with a plurality of the processor cores 210. In one embodiment, each of the local memories 214 is an L2 memory.

The embodiments of FIG. 1 and FIG. 2 could be combined to create a multiple-core processor in which some of the processor cores have dedicated L1 local memories and other processor cores are associated with L2 local memories. The embodiment of FIG. 1 and FIG. 2 could be combined to create a multiple-core processor in which some processor cores have dedicated L1 local memories and are associated with L2 local memories. The embodiments of FIG. 1 and FIG. 2 could be combined in other ways, including the addition of other levels of memory hierarchy. Both the embodiments of FIG. 1 and FIG. 2 include a plurality of local memories, each of the plurality of local memories being associated with a different set of at least one of the processor cores 110.

Figure 3:
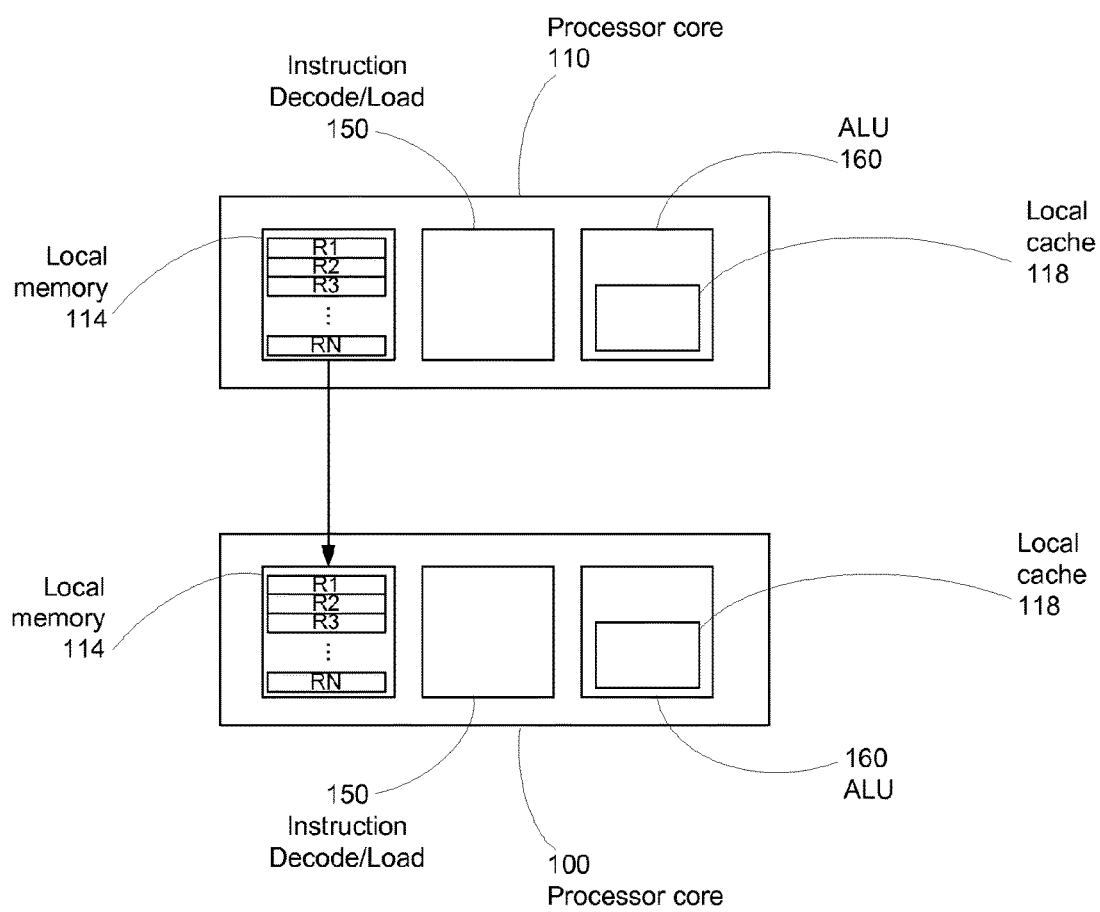
FIG. 3 is a system block diagram of a subset of the processor cores of a multiple-core processor, according to one embodiment.

FIG. 3 is a system block diagram of a subset of the processor cores 110 or a multiple-core processor 100 according to one embodiment. Although only two processor cores 110 are illustrated in FIG. 3, it is to be appreciated that a multiple-core processor may include more than two processor cores.

Each processor core 110 includes an arithmetic logic unit (ALU) 160 that performs arithmetic and logical operations. The ALU 160 may be a floating-point unit (FPU) or may perform complex digital computation. The ALU 160 includes a local cache 118. Each processor core 110 also includes an instruction decode/load unit (IDLU) 150. The IDLU 150 may be a general-purpose or specific-purpose controller.

As described above, each processor core 110 includes a local memory 114. In one embodiment, the local memory 114 includes at least one register and a message queue. Data in a register of a first processor core can be transmitted to the message queue of a second processor core. In one embodiment, the second processor core is configured to be able to read its message queue, indicate that it has received the data, and indicate the number of data items in its message queue. This messaging schema is scalable to many cores. In particular, any processor core 110 can communicate to any other processor core 110 using this messaging schema.

In some implementations of a register-to-register write scheme, it may be difficult to determine when it is "safe" or "allowable" for the write to occur. However, embodiments described herein include message queues such that the destination of a write can choose when to receive the message and copy it to the destination register.

In a particular embodiment, indicating performed by a processor core that has received data is interrupt-driven. For example, a processor core 110 may be configured to be interrupted when it receives the data. In one embodiment, indicating by a processor core 110 is polled. For example, the processor core 110 may be polled where the processor core 110 is configured to be able to determine when to check for availability of the data in its message queue. In one embodiment, a processor core 110 is configured to be able to determine a location in the address space (e.g., which register) of local memory 114 where the processor core 110 will store the received data. Thus, in one embodiment, a first processor core 110 can write into a queue that a second processor core 110 can decide what to do with at a later time.

The multiple-core processor 100 may provide direct hardware support for Partitioned Global Address Space (PGAS) on-chip. In particular, the availability of globally addressable local memories 114 may be used with PGAS programming models and associated programming languages with minimal modification. The globally addressable local stores constitute direct hardware support for the PGAS programming models to make them more efficient and effective.

The local memories 114 for each processor core 110 enable more explicit control of vertical data locality, the movement of data from main memory 130 to the multiple-core processor 100 (e.g., a register of a particular processor core 110) and back again. This control may dramatically improve energy efficiency and performance over other memory schemes. As noted above, each local memory 114 may be visible (via a global memory address space) to all processor cores 110 (or at least one or more of the processor cores 110 besides the processor 110 having the local memory 114) on the chip. This may provide more explicit control over horizontal data locality, further improving energy efficiency.

The multiple-core processor 100 described above may include hundreds of processor cores 110 or other functional units. Programming for multiple-core processors with hundreds of cores using conventional methods may not be energy efficient or otherwise practical. For example, methods involving dynamic scheduling may be difficult to do by hand. However, the multiple-core processor 100 described above may includes many features that directly support scalable abstractions for multiple-core computation that simplify management of data movement and locality.

The node design implements best-of-breed practices and abstractions for fine-grained parallelism, including support for highly synchronized gangs of SPMD/SIMD (Single Process, Multiple Data/Single Instruction, Multiple Data) threads to support conventional divide-and-conquer approaches to speed-up, direct support of communication primitives and memory abstractions for Global Address Space languages including active messages and split-phase bathers, and features to support highly dynamic threading models to support coarse-grained dataflow (DAG-scheduling) in addition to conventional SPMD computing.

In some systems, the power cost of data transfer may be on par with or greater than the power cost of flops (floating point operations). To allow efficient execution, the multiple-core processor 100 may be used by a programmer to explicitly manage data locality.

The multiple-core processor 100 may include a global address space by which the local memories 114 are globally addressable. The global address space may include the main memory 130. As noted above, vertical data locality can be managed (if desired), as the local memories 114 are globally addressable. The local caches 118 exist side-by-side with the local memories to allow dynamic partitioning between explicitly managed memory and automatically managed cache, easing the programming burden and supporting incremental porting.

As also noted above, horizontal data locality can be managed (if desired), as the local memories 114 are addressable by all the processor cores 110 (or at least two or more of the processor cores 110, the processor core 110 associated with the local memory 114 and at least one other processor core 110). Further, distance information may be encoded into the physical memory address. This makes it simple for an application programming interface (API) to compute energy cost and latency of any memory reference from a difference in memory address, thereby supporting self-aware adaptation by introspective algorithm, runtime, or operating system (OS).

Figure 4:
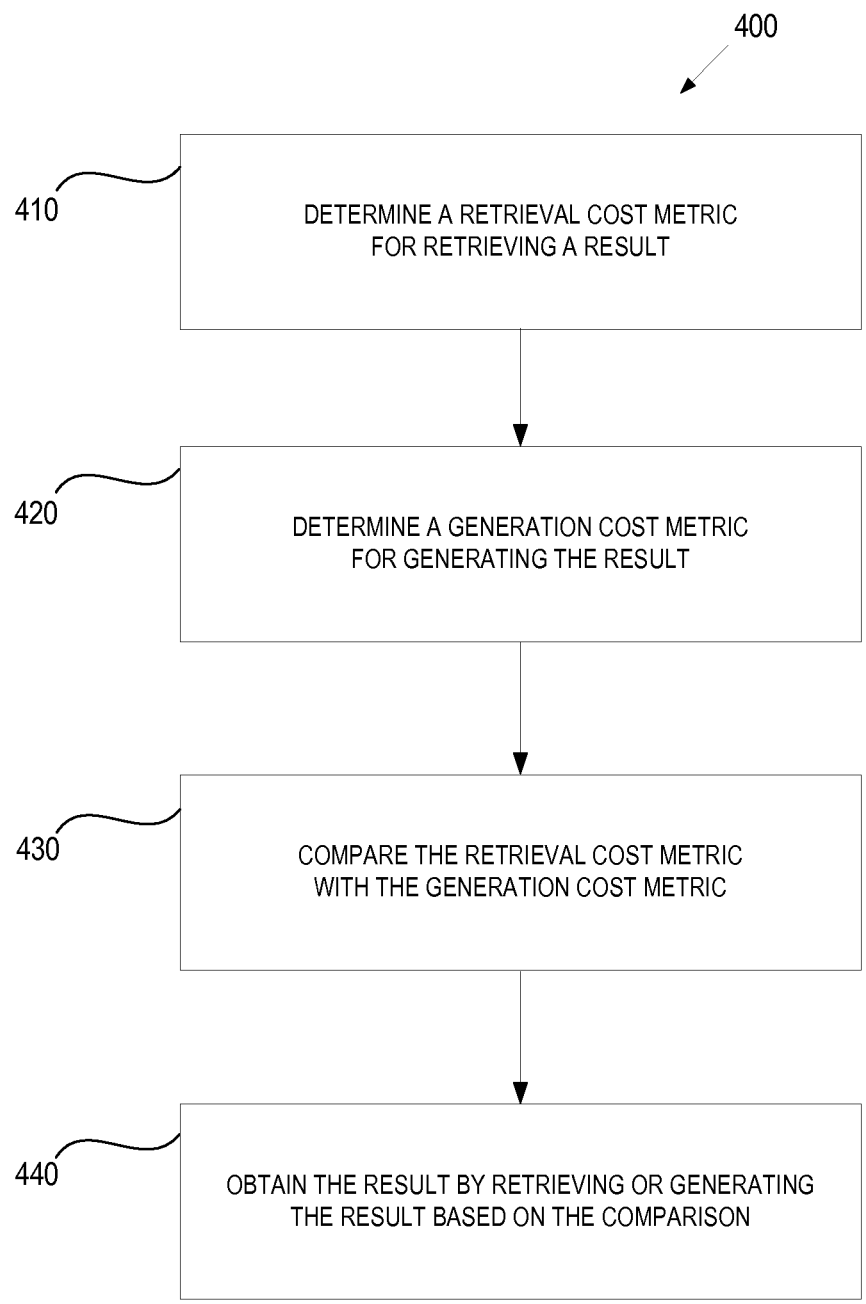
FIG. 4 is a flowchart illustrating an embodiment of a method of selectively obtaining a result by calculation or retrieval from a memory.

FIG. 4 is a flowchart illustrating a method 400 of selectively obtaining a result by calculation or retrieval from a memory. The method 400 begins, in block 410, with determining a retrieval cost metric for retrieving the result. The retrieval cost metric may be the energy cost or latency of retrieving the result from a memory (e.g., one of the local memories 114). The retrieval cost metric may be based on a difference in memory address (e.g., a difference between the memory address of where the result is stored and the memory address of where the result is to be placed). The difference in memory address may be indicative of a physical distance between the two memories.

In block 420, a generation cost metric is determined. The generation cost metric may be the energy cost or latency of generating the result from local information (e.g., in a local cache 118 or an local memory 114 of the processor core 110 performing the method 400). Additional cost metrics may be determined. For example, a hybrid cost metric may be determined as the energy cost or latency of retrieving an intermediate result and generating the result from the intermediate result.

In block 430, the cost metrics are compared. In one embodiment, the retrieval cost metric is compared to the generation cost metric. In another embodiment, the retrieval cost metric is compared to a different threshold. In block 440, the result is obtained by retrieving the result or generating the result based on the comparison. In one embodiment, the result is obtained by retrieving the result if the retrieval cost metric is lower than the generation cost metric and the result is obtained by generating the result if the generation cost metric is lower than the retrieval cost metric.

The cost metrics described with respect to FIG. 4 may, in general, be lowered using thread locality management enabled by the design of the multiple-core processor 100. In particular, lightweight (single instruction) thread control may be provided for spawning and controlling threads at specific locations in the system specified by locality-encoding memory address having one-to-one relation with physical memory address). A programmer, therefore, may put computation next to the data, or conversely put data next to the computation, or any intermediate combination of the two.

Figure 5:
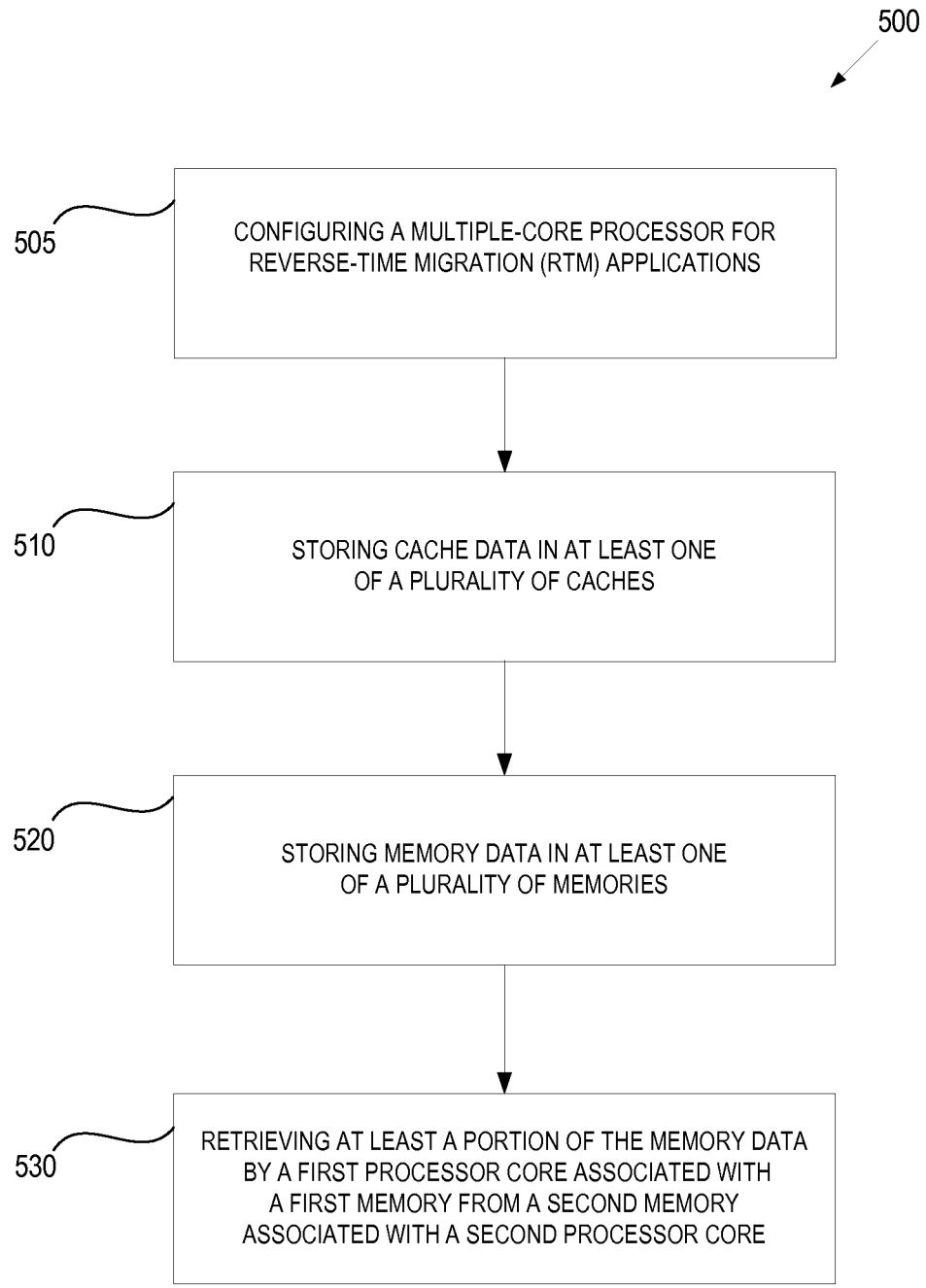
FIG. 5 is a flowchart illustrating an embodiment of a method of using a multiple-core processor configured for reverse-time migration (RTM) applications.

FIG. 5 illustrates a flowchart of an embodiment of a method of using a multiple-core processor configured for reverse-time migration (RTM) applications. The method 500 begins, in block 510, with the configuration of the multiple-core processor for RTM applications. The multiple-core processor may be configured by determining a value for at least one of a number of processor cores of the multiple-core processor, a size of each of a plurality of caches, or a size of each of a plurality of memories. For example, the value may be determined to optimize performance of the multiple-core processor for RTM applications. For example, the number of processor cores may be selected as approximately 128. As another example, the size of each of the plurality of caches may be selected as 16 kilobytes or the size of each of the plurality of memories selected as 256 kilobytes. The values may be selected as other numbers.

The method 500 continues, in block 510, with the storage of cache data in a least one of a plurality of caches. The plurality of caches may be automatically managed. Thus, the storage may be performed automatically so that the multiple-core processor is backward compatible with programming languages that assume automatically managed caches. Each of the plurality of caches may be associated with one and only one of a plurality of processor cores. The processor cores may be interconnected in a Network-on-Chip (NoC) architecture.

In block 520, memory data is stored in at least one of plurality of memories. The plurality of memories may be software-managed. Thus, the storage may be performed in response to software instructions. Each of the plurality of memories may be associated with a different set of at least one of the plurality of processor cores. Each of the plurality of memories may be configured to be visible in a global memory address space such that the plurality of memories are visible to two or more of the plurality of processor cores.

In block 530, a first processor core of the plurality of processor cores associated with a first memory of the plurality of memories retrieves at least a portion of the memory data stored in a second memory of the plurality of memories associated with a second processor core of the plurality of processor cores. The second processor core is different from the first processor core and the first memory is different from the second memory. Thus, one processor core (having its own local memory) retrieves information from the local memory of a different processor core. Both memories may be accessed by both processor cores using the global address space.

The possibilities presented by the multiple-core processor 100 may present a daunting task for a programmer. To ease this burden and allow users to fully utilize all available resources, the multiple-core processor 100 may include the simplifying features described below.

The multiple-core processor 100 may be used with a rich threading model. In particular, the multiple-core processor 100 may support work queues, atomic memory operations (AMOs), and Active Messages (AM). Hardware managed thread control interfaces enable atomic operations to enqueue remote threads for message driven computation, dequeue remote threads in neighborhood for work-stealing (load balancing), and launch AMOs or AMs next to any memory location (subject to memory protection limits). Activation Lists enable threads to join notification trees for rapid broadcast of condition change (memory or thread completion).

The multiple-core processor 100 may be used with a messaging schema, as described above, which includes ultra light-weight synchronization primitives. In particular, the multiple-core processor 100 provides a direct inter-processor message interface (word granularity using register 'mov' instruction) that bypasses memory hierarchy to enable fine-grained on-chip synchronization to enable robust memory consistency model for non-cache-coherent global address space memory operations.

In one embodiment, the multiple-core processor 100 guarantees a strict ordering of specially identified messages so that they are received in precisely the order they are transmitted. Thus, the specially identified messages can be used effectively to communicate synchronization information. Thus, in one embodiment, the multiple-core processor 100 is configured to designate an order of transmission for specially identified message. In turn, the specially identified messages are received in the order and indicate synchronization information.

Also, reliability may be a concern when designing systems containing hundreds of processor cores 110. Specialized features to prevent faults from occurring as well as hardware support to allow fast recovery in case a fault does occur, may be included, such as those described below.

The multiple-core processor 100 may be used with micro-checkpointing: In particular NVRAM (non-volatile random-access memory) memory mats placed adjacent to processing elements may minimize energy cost of preserving state. NVRAM technology is fully compatible with CMOS (complementary metal-oxide-semiconductor) logic processes, has eight times higher density than 1 T-SRAM (static random-access memory), is less susceptible to bit flips, consumes no energy when idle, and used one-hundred times lower energy than FLASH technology.

Other technical features that may be used with the multiple-core processor 100 are highly configurable energy-efficient processor cores 110 to support rapid and broad design space exploration; a unified memory/interconnect fabric that makes memory chips peers with processor chips using advanced memory protocol with rich synchronization semantics (such as messaging schema including ultra light-weight primitives as described above) for global memory consistency to support GAS programming models (including Partitioned Global Address Space (PGAS) on-chip programming models and associated programming languages as described above), and coordinated power redistribution with system-wide coordination of power management to ensure global optimality of power throttling decisions and enable power to be redistributed (flops to memory I/O rates) to accelerate performance critical components in a fixed power envelope.

In view of the above, and given that, in some applications, the cost of data movement will dominate energy consumption, one may select a very energy-efficient and highly configurable processor core 110 (derived from the highly commoditized embedded space in our case) and modify it to enable rich inter-processor communication services, fault recovery mechanisms, and locality-aware memory services to support productive parallel computing as described above.

In one embodiment, the processor cores 110 are Tensilica cores. In one embodiment, the processor cores are Tensilica LX2 cores. In one embodiment, each processor core occupies only 0.35 square mm (millimeters) on a 65 nm (nanometers) process. While simple, this core provides 80 basic instructions that guarantee the execution of arbitrary code regardless of customizations applied to the processor. In one embodiment, the processor cores 110 comprise a 4-slot SIMD FPU that is capable of executing 4 FLOPs/cycle (2 MADD [multiply/add] operations) at 1 gigahertz (GHz). The SIMD unit can be extended to include additional slots using VLIW (very long instruction word) extensions. A VLIW core capable of executing 8 FLOPs/cycle would increase our power consumption to 40 mW/core at 1 GHz, but double the peak FLOP rate.

In one embodiment, the processor core 110 supports up to four hardware thread contexts. The processor core 110 may support more or fewer hardware thread contexts. Further, the number of thread contexts may be virtualized to support thread pools and deep thread queues. To eliminate the overhead of supporting large thread pools, zero overhead context switches will be supported by enabled load of next thread context information asynchronously into a background thread context without disturbing the foreground context. When state load is complete, the background context swaps with the foreground and the process of background context switching continues. Any interrupt or urgent message context, such as Active Messages (AM), can be loaded up in the background when it arrives while the current thread context runs ahead until the interrupt or AM handler is fully loaded. It switches to the AM or interrupt context only after the load is complete so that there is no idle time while waiting for context to load.

As noted above, the multiple-core processor includes a plurality of local memories 114 and a plurality of local caches 118. Although the terms "memory" and "cache" are used to distinguish between the local memory 114 and local cache 118, it will be appreciated that "memory" and "cache" are generally synonymous.

In one embodiment, both the local memory 114 and local cache 118 are L1 data caches. As described above, the local cache 118 may be an automatically managed cache and the local memory 114 may be a software managed memory that provides more explicit control over data locality. The processor core 110 can have up to 128 registers that are visible through a 16-register window. In one embodiment, there is an 8K instruction cache, 64K of software managed memory, and 16k of automatically managed memory per core. In other embodiments, the amount of instruction cache, software-managed memory, and automatically managed memory may be different.

As for the local memory 114, the cache-lines can be tagged as shared or exclusive. Lines tagged as exclusive may not invoke the cache-coherence protocol to reduce overhead on the on-chip communication network, whereas lines tagged as shared may maintain on-chip coherence as a Non-Uniform Cache Architecture (NUCA) organization. The cache-coherence supports an incremental porting path for existing applications or kernels that have little exploitable data locality. Performance-critical portions of the code would take more advantage of the local stores to more carefully manage data locality and data movement.

In one embodiment, the local memory 114 is not involved in the cache-coherence protocol, but is globally visible in the address space of the system in a non-virtualized address range. This memory interface is integrated with the extended memory fabric will support addressing between chips to create a global address space. This allows any processor core 110 in the multiple-core processor 100 to access the local memory 114 of any processor core 110 using simple load/store semantics as a partitioned global address space (subject to segmented address range protection), thereby enabling fine-grained control of memory interaction. Each processor core 110 may include an integrated DMA engine to enable efficient, asynchronous bulk data transfers (both on-chip and to remote locations). Fine-grained synchronization primitives may be used to maintain memory consistency for non-cache-coherent accesses to remote local memories 114.

The multiple-core processor 110 supports two different modes of inter-processor (between processor cores 110) communication. One data path is via the memory interface and the other is via a messaging interface, which bypasses the memory subsystem to support fine-grained inter-processor synchronization primitives to support memory consistency for global address space, feed-forward pipelines for streaming data, and ultra-low-latency word-granularity inter-processor communication. The messaging interface appears as direct inter-processor message queues, but the implementation virtualizes a single memory buffer at each processor end-point. Messages can be pushed into the queue using a single assembly instruction. The queues can be polled to check their depth by both the receiving and the sending processor, and can operate in blocking mode (if the queue is full) or be programmed to throw an exception if queue depth is exceeded.

As noted above, the multiple-core processor 100 may be designed using a Network-on-Chip (NoC) architecture. A NoC architecture may be particularly suitable for a multiple-core processor 100 with hundreds of processor cores 110.

In one embodiment, the processor cores 110 are interconnected using a packet-switched 2D planar NoC that is organized into two planes—control-plane and data-plane. The control data plane provides an ultra-low-latency communication path between cores that bypasses the memory hierarchy to provide rich set of synchronization primitives for support of non-cache-coherent memory consistency models. The node has a separate memory fabric data plane that enables high-bandwidth datapaths for large data transfers and forms the basis for a scalable global memory address space fabric. The baseline NoC design may be an all-electronic packet-switched with dimension-ordered routing to minimize complexity and simplify enforcement of packet ordering required by many synchronization primitives. In one embodiment, the memory controllers and all off-chip I/O interfaces are peers to the processor cores 110, and are arranged around the outer edge of the on-chip NoC.

In one embodiment, as described above, the multiple-core processor 100 is designed as a massively parallel system implemented as a network of chips each with an array of interconnected processing elements (PE) that can efficiently access global memory on a shared I/O fabric, or operate on local, per core memory for higher performance. The multiple-core processor 100 supports automatically-managed caches (e.g., the local caches 118) and on-chip cache coherence mechanisms to support incremental porting, but also offers software-managed memories (e.g. the local memories 114) to support incremental porting. Cache coherence is also supported for explicitly labeled address-ranges (e.g., a subset of the entire address range), in order to isolate snooping traffic required if the entire address range were made cache-coherent. This may also reduce the overhead of memory address tags.

In one embodiment the local memories 114 are organized as a virtual local store which provides high bandwidth, low latency access to instructions and data for the current PE thread context. In addition to this high bandwidth local store each processor core 110 will have a local non-volatile memory partition (as part of or separate from the local memory 114) that will be used for local program binary storage, test and maintenance program storage and local checkpoint data storage.

In one embodiment, clusters of cores (similar to that described above with respect to FIG. 2) will share a 1 megabyte (MB) instruction cache to prevent redundant off-chip data loads when groups of processors are operating in SIMD or SPMD mode. Per chip, computational inputs and results for each processor core may be staged to and from a managed area of a larger, per-chip memory that is organized as a partitioned global address space. This memory may part of the system's unified global interconnect fabric and acts as a peer on that fabric. Data sets are streamed between global memory partitions to implement communication between adjacent chips, system boards, chassis, and ultimately equipment racks.

Block-partitioned global arrays may be used for data parallel computation to layout data across disjoint memory spaces. In some data parallel software implementations, prefetch (for a typical cache hierarchy) or DMA operations are used to copy data from logically contiguous locations in memory to the partitioned local-stores on-chip (for a local-store architecture). Programming independent processor-local DMA units may result in flood of stochastic memory addresses to memory controllers or off-chip I/Os. In another embodiment, to support local SPMD and SIMD execution models as well as the semantics of partitioned global address space languages, a shared DMA engine is employed. In contrast to programming independent DMA units, a shared DMA unit can take the stream of requests and perform orderly DMA requests to the memory controllers and off-chip I/O system and distribute the among the processing elements on-chip. This may be similar to partitioned array constructs in PGAS languages (X10, CAF, and UPC).

The shared DMA unit may also be useful for implicitly aggregating off-chip communication. For example, for a 2D block-structured grid that has been partitioned among the processor cores 110 on chip, if one were to perform the ghost-cell exchange with peers on a neighboring chip, one may end up with many independent small-sized messages. However, with patterned DMA, a copy can be expressed as a single organized operation that can be implicitly bundled into a single large streaming message. The message description may actually be more convenient for compiler writers than managing this as independent RDMAs between neighboring chips. The shared DMA unit may take advantage of the global addressability of the local memories 114 to enable simple mapping for copies between the main memory 130 address space and partitioned address space of the local memories 114. For patterned access, any multi-dimensional array mapping can be expressed using, e.g., ndims, Offset [ndims], stride[ndims], block[ndims]. Other array mappings can be used.

In one embodiment, a hierarchical global addressing scheme encodes locality information directly into the memory address and explicitly distinguishes on-chip vs. off-chip memory. The location of any reference (rack, node, module, down to core) is directly encoded in the address and the distance between any memory references can be calculated directly by subtracting any two pointers. Such an addressing will allow APIs to enable self-aware OS and applications to calculate the latency and energy cost of any remote memory reference. A particular application or runtime can choose to be oblivious to the structure of the address pointers and it will simply appear as a global-address space system. However, if there is any exploitable locality, the memory address encoding would make exploitation of the locality information readily available to the application developer or runtime system. An example of such exploitation is described above with respect to FIG. 4.

Given the energy-cost of off-chip references, it may be important to specially distinguish between on-chip and off-chip memory to enable better control over data movement up and down the cache hierarchy. Whereas some caches may virtualize the notion of on-chip vs. off-chip memory, which may offer a convenience for programmers, but little control over vertical data locality, the software-managed local memories 114 that work side-by-side with the local caches 118, enables programmers and compilers explicit control over locality when they desire to exploit this ability.

To make access to the local memories 114 more convenient, the on-chip memory may be mapped in the global address space of the system, which can be directly referenced with loads and stores from any of the processor cores 110. This supports explicit control of data locality (when desired) and benefits from the global addressing to make references to any level of the memory hierarchy simple. Different address ranges within the local store can be protected using a simple segmented protection scheme to prevent unauthorized reads or writes from cores that are not at the same privilege level.

In addition to the energy cost of data movement vertically through the cache-hierarchy, there is also a distance-dependent cost for remote references that is referred to as "horizontal data locality." Whereas some cache-coherent and global address space memory models enable convenient access to data, they may not provide notion of data locality. Some PGAS memory models, provide a uni-dimensional notion of locality that distinguishes remote memory references from local ones (memory is either "local" or it is "remote"), but this does not fully represent the distance dependent cost of remote references. By encoding locality information directly into the memory address pointers, computation of the energy cost and delay of referencing any pointer can be computed trivially by computing the difference of any two physical addresses. To expose this capability to the runtime system, an API can enable a self-aware OS or algorithm to use memory addresses to directly calculate the energy cost of a remote reference.

The memory address space may also encode thread context locality. The address for thread spawning interfaces, work-queues (for work-stealing or message-driven computation), and active message launch sites may be directly represented in the memory address space so that one can actively control the locality of the computation relative to the location of the memory address the computation targets. For example, a recursive graph algorithm can infer the memory address of any of the neighbors of the current node that it is operating on and submit a remote thread invocation that is next to data that it is operating on by performing an "atomic queue add" operation to insert the thread context into the thread-spawn interface that is closest to the memory address that contains the data. The correspondence between the memory addresses and thread launch site makes it much simpler to control locality of computation and data in relation to each other. A block of code for a thread could be directly migrated to the processing element that contains the memory addresses that the code operates on because the memory addresses directly identify which node to launch the thread on. APIs could support thread launching requests of the form "spawn_thread_at(thread_code_ptr, memory_address_target)". This may be particular useful for support of graph algorithms.

The system global address space may be implemented with variable address sizes depending on scope of reference. The locality of data may be encoded directly into the physical address of any memory reference. For example, in one embodiment, each module is mapped into an equally partitioned 64-bit global physical address space. Within each of those partitions, subgroups of processing elements that are spatially close to one another subdivide that module address space (for example a 48-bit address may refer to memory within an individual module). This subdivision of address space is applied recursively all the way down to individual processing elements (and their associated threads) so that the smallest 32-bit address words would refer to thread-local memory.

In this addressing scheme, the locality of any given memory reference and thread location is implicit in the memory address. The size of the pointer is related to the distance of the reference so that the energy and space cost of carrying around large pointers matches the energy cost of the data movement associated with the remote data reference. Distance of reference can be directly inferred from the numerical distance of the memory address. The locality of each reference is encoded into the address using a dimensional encoding scheme. Since the locality of computation is directly encoded in the memory address, codes can make runtime decisions about whether to move the computation closer to the data by performing runtime examination of the memory address stream. The relative physical distance between any two memory addresses can be quickly calculated in a single instruction, and a lookup table used to convert that logical distance into a measure of energy cost or time to support intelligent runtime decisions about data communication.

Memory translation may be hierarchical to eliminate the need of memory address registration (memory pinning) and globally consistent memory address mapping. All memory addresses on the global memory fabric may be physical addresses that clearly identify the location of the target. The physical address map may be contiguous (without holes) and support dynamic re-assignment of addresses in the face of hard failures using address remap registers for a level of address assignment that is below the level of the physical addressing scheme. For example, in one embodiment, each node will have an offset register that locates it within the global 64-bit physical address space. If that node fails, then the spare will get assigned that offset before state restoration and integration into the global memory fabric to fill in the hole left by the failed node. Placing the physical to hardware address translation (using the offset registers) below the physical address layer enables rapid swap-out of hardware on a running system without having to do a global broadcast to the network routers to reconfigure routing tables.

Memory addressing within the node may be, in one embodiment, demand paged, with memory address translation occurring at the node boundaries. Protection may be accomplished through a segmented memory protection scheme to maintain precise exceptions. Each processor core 110 may contain a memory address offset register (storing a memory address offset) for convenience in handling local addresses. The local memory addresses may be, e.g., 32-bit with long-distance (off-node) addresses requiring extra cycles to construct a 64-bit memory address. The extra processing cost for constructing off-node accesses is masked by the energy and latency cost of fulfilling the remote request.

Each processor core 110 can protect address ranges of their local address space using segment protection. However, virtual to physical address translation (to prevent address fragmentation) may occur within the processor core memory controller. This reduces the overhead of supporting TLBs (translation lookaside buffers) at each of the light-weight processing elements and ensures that memory pinning is not required for RDMA (remote direct memory access) and one-sided messaging between processing elements.

Individual processing elements may use a local offset register to determine their offset in the global virtual memory address space for convenience. This segment offset may be controlled by the OS, and can be used to remove a processor core 110 from the address space and map a spare into its place in the case of failures. Likewise, nodes may use a runtime-assigned offset register that defines its place in the global 128-bit memory address space. Just as with the processor cores 110, the nodes in the system can be remapped in the address space to swap in spares in the case of hard failures—each node may be associated with an ID register that can be redefined at runtime to bring in spare nodes on-demand to recover from failures.

The processing elements on the node (and their associated threads) may see a flat view of the node's memory, and can use different pointer classes to access increasingly non-local data (32-bit pointers for data that is known to be thread local up to 64-bit pointers for remote references). The variable pointer sizes provide a better correspondence between the energy-cost of carrying the larger pointer (and address translation) for long pointers so that it is masked by the energy cost of performing the remote data access. It would be a waste of energy and space to require universal use of 64-bit pointers for data that may be inferred to be thread local through static analysis.

The multiple-core processor 100 can support a rich threading model with ultra-light-weight mechanisms for control and spawning of threads next to data. In particular, the multiple-core processor 100 supports lightweight (single instruction) thread control for spawning and controlling threads at specific location in the system specified by locality-encoding memory address (one-to-one relation with physical memory address). For example, computation may be put next to the data, or conversely data may be put next to the computation, or any intermediate combination of the two.

To facilitate lightweight remote thread spawning mechanisms, work-queues may be made a first-class object in the system architecture and the thread launch and control interfaces may be exposed as memory-mapped device locations. The thread launch and control interface may be expressed as an atomic memory operation (AMO) to push a thread context on a memory-mapped device address that represents a remote thread queue. The thread context consists of a pointer to the code segment and a pointer to a structure containing the thread state. The thread control interface can be used to push a thread context onto a work queue for the processing element that is closest to that memory address, or "steal" work from a work queue at that address. The ability to add items to the work queue by remote entities may be governed, e.g., by the memory protection system (described in the security section). For security reasons, the code address space may be in a separate address space from the data addresses (code/data space separation), so mutable memory and code memory are disjoint while following the same locality-encoding addressing scheme.

The multiple-core processor 100 can support a range of AMO operations to support various forms of remote synchronization and memory consistency. The AMOs include single-instructions like remote "compare and swap," "atomic increment," as well as interactions with a "Work Queue" abstraction to implement a thread control interface.

Each processor core 110 (or at least one or more of the processor cores 110) has a "work queue" associated with it. The work queue contains a stack of thread contexts for the processing element or runtime to service. The AMOs may be used to push a thread context onto the work queue, remove one or more thread contexts from a queue, and test queue depth. The memory mapped location of the work queue determines which processing element's work queue will be targeted by the operation. Specific device addresses may be associated with classes of work queues to differentiate priority of queue and distinguish urgent messages (that may cause an interrupt) from passive work items. An AMO that targets a work queue can throw an exception on the source processor if it does not succeed (e.g. if the remote queue is full, a protection violation, or any other illegal request).

The manner by which the processor core 110 services items stored in its work-queue may be defined by the runtime system or user-space scheduler. The notion of a "shared work queue" that is associated with a group of processors on a node rather than an individual core can also be supported, enabling rich abstractions for load balancing and work stealing interfaces.

The lightweight thread spawn combined with a global address space makes it as easy to move the computation to data as it is to move data to the computation. A self-aware runtime can trivially compute the costs of either scenario using address arithmetic and decide which course of action to pursue.

In addition to being able to push work onto a work queue, the memory mapped interfaces enable simple neighborhood-based work-stealing for runtimes that choose to implement it. When a processor core 110 work queue is empty, it can use a random number generator to select from a list of nearby memory addresses (more sophisticated schemes could use a Gaussian probability distribution to perform the neighborhood search). The processor core 110 can then use an AMO to try to atomically remove thread contexts from the work queue of a neighboring processor core 110. If there is no work available, then the AMO will fail and the processor will try to steal from a different work queue. This approach ensures work-stealing with minimum energy impact.

An active message can be scheduled just like a remote thread spawn, but the context of the thread is the message body and the code segment is the AM handler that will be invoked by the target processor core 110 when it pulls the message off of its work queue. The interface for scheduling active messages (AMs) may differ from the generic thread queue interface in that items on this queue are processed by the target processor core (it cannot be dequeued by a work-stealing runtime), because the destination of an AM is intentionally targeted at a particular processor core.

Large collective operations may require notification of a large number of peer processes in a scalable manner. To accomplish this, a special category of thread queue called an "activation list" may be defined. An activation list is a list of Active Message (AM) contexts that will be dispatched when a trigger "event" taps an "activation" memory location. An "activation tree" can be built from a hierarchy of "activation lists," for scalable event dispatching. These "activation lists" can be implemented as ephemeral or persistent. An ephemeral list will be removed when the activation list has been dispatched, and will have to be re-built to set up the notification list again. A persistent list will maintain the list of targets until it is explicitly torn-down, and can be activated multiple times.

The multiple-core processor 100 described above may be used to perform reverse-time-migration (RTM). Although described below with respect to seismic applications, it is to be appreciated that RTM may also be applied to other acoustic application (e.g. oceanographic tomography), optical applications, or other applications.

In seismological applications, it may be necessary to create a subsurface reflectivity image to perform various analyses of the Earth's interior, such as crust development and exploration for hydrocarbons or minerals. This process may entail collecting seismic data of the area via an energy source, such as explosion, that generates acoustic waves which are reflected by impedance contrasts of rock layers. Each of these "shots" has an array of receivers that listen to reflection for several seconds, followed by the shot movement in equidistant offsets until the area of interest is covered. To effectively translate this process into a quality image, a sophisticated seismic processing workflow can be applied involving several iterative steps including data acquisition and preprocessing, velocity modeling, wavefield migration and imaging.

A hardware/software co-design process focused on reducing the overhead of the seismic wavefield migration phase—the most computational-intensive component of this workflow methodology can be performed. For example, this can be used to correct mispositioned reflectors by cross-correlating the source and receiver wavefield to the desired subsurface image.

In one embodiment, the RTM algorithm comprises three main steps. In the first step, the source wavefield is propagated forward in time starting from a synthetic simulated source signal at time zero. In the second step, the receiver wavefield is computed by propagating the receiver data backwards in time. In the third step, the imaging condition cross-correlates the source and receiver wavefield to create the final subsurface image.

In some instances, the wavefield propagation kernel in the first two steps requires most of the overall RTM computation time. For example, in some instances, the kernel consumes more than 90% of execution time.

Large computational demands result in extremely slow processing or limited, low-resolution seismic analysis on some systems. It is therefore advantageous to improve the performance and energy efficiency of these techniques.

The simulation of the wavefield propagation is performed most commonly with an approximation of the wave equation represented, where c is the velocity function, u is the pressure function at point (x,y,z) (x, y, and z being real numbers):

$$(\Delta - 1/c^2 d^2/dt^2)u = 0.$$

The approximation to this equation can be derived using either implicit or explicit techniques. The former leads to large linear systems that can leverage large-scale parallel solvers, but can suffer from scalability limitations at high concurrency. The explicit approach computes the next timestep of the wavefield propagation via a "stencil" update for each point using fixed timesteps. In some embodiments, 32-bit values are used to provide sufficient accuracy to receive high quality imaging results. Even lower bit widths may be used to further increase performance of FPGA-based solutions.

Stencil computations are used in a broad range of scientific applications involving finite-differencing methods to solve partial differential equations (PDEs) on regular grids. At each point, a nearest-neighbor computation (stencil) is performed, where the value is updated with weighted contributions from a subset of points neighboring in time and space. The stencil "order" is a theoretical bound on the rate at which error decreases relative to increased resolution of pressure field derivation approximation. Thus, high-order stencils typically generate large working sets.

The wave equation above comprises a Laplacian stencil and a time derivative. In one embodiment, the Laplacian component is modeled with 25 points and a linear combination using 5 weights (one for each of the four equidistant sextuplets of grid points and one for the center). Thus, the Laplacian may use 5 floating-point multiplies and 24 floating-point additions. The wave equation's time derivative may be modeled by accessing not only the spatial grid point at the current and previous time steps, but also the medium's velocity at that point. When modeling of the Laplacian and time derivative are combined, the complexity of the inhomogeneous isotropic wave equation's stencil is evident. Higher order Laplacian stencils (e.g. 12th-order) may access neighboring points further from the center and induce a corresponding increase in computation.

As described with respect to FIG. 5, the multiple-core processor 100 described above can be configured for or optimized for performing RTM and particular for modeling the high-order Laplacian stencil at the core of the wave equation. Such optimization may allow RTM calculations to be performed in-situ on seismic survey sites and on shipborne platforms. Such configuration or optimization may enable RTM processing to be done on a ship in real-time or near-real-time.

Numerous aspects can be combined in the RTM configuration. However, it is to be appreciated that in some embodiments, some but not all of the aspects will be performed to configure the multiple-core processor 100 for RTM.

In one embodiment, several variants of the wave equation modeling algorithm (e.g., code for the algorithm) are manually unrolled and an appropriate one is selected at runtime. In one embodiment, cache blocking and thread parallelization can be merged to minimize the intra-thread cache working set whilst simultaneously maximizing the inter-thread overlap of working sets. This technique can be extended with DMA-filled multibuffering to maximize utilization of its on-chip local stores. In one embodiment, the C code (including cache bypass) can be manually unrolled and SIMDized to express the requisite data and instruction-level parallelism as well as further optimize the SIMD implementation ("register pipeline") to minimize L1 accesses. The selection of scalar or VLIW cores and use of a local store may, for example, obviate (or at least reduce) the need for SIMD and write allocate optimizations, respectively. In one embodiment, thread pinning may be exploited as a first touch policy to ensure proper NUMA allocation and to avoid under utilizing the memory controllers.

One aspect of hardware optimization may be selecting the on-chip memory size (of the local memories 114) so as to capture the maximum number of temporal recurrences for the high-order stencil kernel. For example, the 8th order wave equation using 64×32 cache blocks may require at least 17.6 bytes. Moreover, as an implementation may keep a working set of 12 working and 4 buffered planes (some with halos) in the local store, the wave equation may be optimized with 166 KB of local store (for each of the local memories 114) for this decomposition. As one moves to the 12th order wave equation, the size of the local memories 114 may be 238 KB per processor core 110.

The number of processor cores 110 may be configured or optimized for RTM. For example, the number of processor cores 110 may be selected to saturate the off-chip memory bandwidth. An iterative optimization process may be used, as changes in the core count requires a resizing of the local-stores (to incorporate the halos from the blocked implementation), which in-turn impacts the optimal core count (to effective capture temporal recurrences). For example, the multiple-core processor 100 may include approximately 100 processor cores 110 and 238 KB of local memory 114 per processor core 110. The optimization may include rounding of figures (e.g., to the nearest power-of-two to simplify the layout of the chip and NoC topology). Thus, in another example, the multiple-core processor 100 may include 128 processor cores 110 each with 256 KB of local memory 114.

In one embodiment, an RTM-configured multiple-core processor 100 includes DDR3 SDRAM (double date rate type three synchronous dynamic random access memory) memory. In one embodiment, an RTM-configured multiple-core processor 110 includes DDR3-1600 memory.

In one embodiment, the size of the local memories 114 of a multiple-core processor 110 is configured or optimized for RTM applications. In one embodiment, the size of the local memories 114 of an RTM-configured multiple-core processor 100 is 256 kilobytes. In one embodiment, the size of the local caches 118 is configured or optimized for RTM applications. In one embodiment, the size of the local caches 118 of an RTM-configured multiple-core processor 100 is 16 kilobytes. In one embodiment, the local caches 118 are private.

In one embodiment, the peak memory bandwidth of the multiple-core processor 100 is configured or optimized for RTM application. In one embodiment, an RTM-configured multiple-core processor 100 is configured to have a peak memory bandwidth of 50 gigabytes per second.

In one embodiment, an RTM-configured multiple-core processor 100 is used with an instruction set extended to include special instructions that accelerate indexing of higher-order stencils (8th to 12th order stencils) that are required by the RTM application.

In one embodiment, an RTM-configured multiple-core processor 100 comprises QDR (quad date rate) Infiniband 4× interfaces.

In one embodiment, the NoC architecture of the multiple-core processor 100 is configured for RTM applications. In one embodiment, the NoC architecture includes NoC links and each of the NoC links has a bandwidth of approximately 25 gigabytes per second. In a particular embodiment, the NoC architecture includes endpoints arranged in an n×m rectilinear grid, where the number of endpoints is sufficient for the cores, spare computer processor cores, memory controllers, and input/output devices.

In one embodiment, each of the processor cores 110 comprises a private 8 kilobyte instruction cache memory. The private instruction cache memory may be separate from the local memory 114 and local cache 118. In an exemplary embodiment, each of the processor cores 110 includes a L2 instruction cache memory that is shared among a plurality of the other cores. The L2 instruction cache memory may be separate from the local memory 114 and local cache 118

In one embodiment, each of the processor cores 110 is configured to be able to compute two single precision floating point operations per clock cycle of the multiple-core processor 100. In one embodiment, each of the processor cores 110 is configured to execute very long instruction word (VLIW) instructions on a plurality of execution units. In one embodiment, each of the processor cores 110 is configured to execute 64-bit wide instructions.

It is to be understood that the above description and examples are intended to be illustrative and not restrictive. Many embodiments will be apparent to those of skill in the art upon reading the above description and examples. The scope of the invention should, therefore, be determined not with reference to the above description and examples, but should instead be determined with reference to the appended claims, along with the full scope of equivalents to which such claims are entitled. In particular, it is to be appreciated that the claims are independent of choice of processor core, chip packaging technology, and any off-processor-chip technology choices including memory technology and network interface. The disclosures of all articles and references, including patent applications and publications, are incorporated herein by reference for all purposes.

What is claimed is:

1. A multi-core computer processor comprising:
   a plurality of processor cores interconnected in a Network-on-Chip (NoC) architecture;
   a plurality of automatically-managed L1 caches, each of the plurality of caches being associated with one and only one of the plurality of processor cores; and
   a plurality of software-managed L1 memories, each of the plurality of memories being associated with a different set of at least one of the plurality of processor cores and each of the plurality of memories being configured to be visible in a logically partitioned global memory address space such that the plurality of memories are visible to two or more of the plurality of processor cores, wherein each logical partition comprises an address space corresponding to one of the plurality of memories, and wherein each of the plurality of processor cores has a one-to-one relationship with a different locality-encoded, non-virtualized address range to a corresponding logical partition, and
   wherein at least one of a number of the plurality of processor cores, a size of each of the plurality of caches, or a size of each of the plurality of memories is selected to optimize a reverse-time-migration (RTM) computation.

2. The multi-core computer processor of claim 1, further comprising an independent control plane comprising direct message queues between the processor cores, wherein the independent control plane is configured to perform synchronization and enforce memory consistency between the plurality of memories.

3. The multi-core computer processor of claim 1, wherein the plurality of memories comprises a plurality of local scratch pad memories.

4. The multi-core computer processor of claim 1, wherein the plurality of memories comprises a plurality of L1 memories.

5. The multi-core computer processor of claim 1, wherein the plurality of memories comprises a plurality of L2 memories.

6. The multi-core computer processor of claim 1, wherein the plurality of memories is software-managed and the plurality of caches is automatically managed.

7. The multi-core computer processor of claim 1, wherein each of the plurality of memories is associated with one and only one of the plurality of processor cores.

8. The multi-core computer processor of claim 1, wherein the number of the plurality of processor cores is approximately 128.

9. The multi-core computer processor of claim 1, wherein the size of each of the plurality of caches is 16 kilobytes.

10. The multi-core computer processor of claim 1, wherein the size of each of the plurality of memories is 256 kilobytes.

11. The multi-core computer processor of claim 1, wherein each of the plurality of processor cores comprises a private 8-kilobyte instruction cache memory.

12. The multi-core computer processor of claim 1, wherein each of the plurality of processor cores comprises a L2 instruction cache memory that is shared among at least one other of the plurality of processor cores.

13. The multi-core computer processor of claim 1, wherein each of the plurality of processor cores is configured to be able to compute two single-precision floating-point operations per clock cycle of the multi-core computer processor.

14. The multi-core computer processor of claim 13, wherein each of the plurality of processor cores is configured to execute very long instruction word (VLIW) instructions on a plurality of execution units.

15. The multi-core computer processor of claim 14, wherein each of the plurality of processor cores is configured to execute 64-bit wide instructions.

16. The multi-core computer processor of claim 1, wherein at least one of a number of the processor cores, a size of each of the plurality of caches, or a size of each of the plurality of memories is configured for modeling a wave equation of the reverse-time-migration (RTM) computation.

17. The multi-core computer processor of claim 1, wherein at least one of a number of the processor cores, a size of each of the plurality of caches, or a size of each of the plurality of memories is configured for modeling a wave equation of the reverse-time-migration (RTM) computation via an 8th or 12th order Laplacian stencil.

18. A method of using a multi-core computer processor, the method comprising:
   determining at least one of a number of a plurality of processor cores, a size of each of a plurality of caches, or a size of each of a plurality of memories that optimize a reverse-time-migration (RTM) computation;
   storing cache data in at least one of the plurality of caches, each of the plurality of caches being associated with one and only one of the plurality of processor cores interconnected in a Network-on-Chip (NoC) architecture;
   storing memory data in at least one of the plurality of memories, each of the plurality of memories being associated with a different set of at least one of the plurality of processor cores and each of the plurality of memories being configured to be visible in a logically partitioned global memory address space such that the plurality of memories are visible to two or more of the plurality of processor cores, wherein each logical partition comprises an address space corresponding to one of the plurality of memories, and wherein each of the plurality of processor cores has a one-to-one relationship with a different locality-encoded, non-virtualized address range to a corresponding logical partition; and
   retrieving, by a first processor core of the plurality of processor cores associated with a first memory of the plurality of memories, at least a portion of the memory data, wherein the at least a portion of the memory data is stored in a second memory of the plurality of memories associated with a second processor core of the plurality of processor cores, the second processor core being different from the first processor core and the first memory being different from the second memory.

19. The method of claim 18, wherein the number of the plurality of processor cores is approximately 128.

20. The method of claim 18, wherein the size of each of the plurality of caches is 16 kilobytes.

21. The method of claim 18, wherein the size of each of the plurality of memories is 256 kilobytes.

22. A multi-core computer processor comprising:
a plurality of processor cores interconnected in a Network-on-Chip (NoC) architecture;
a plurality of caches, each of the plurality of caches being associated with one and only one of the plurality of processor cores; and
a plurality of memories, each of the plurality of memories being associated with a different set of at least one of the plurality of processor cores and each of the plurality of memories being configured to be visible in a global memory address space such that the plurality of memories are visible to two or more of the plurality of processor cores, and wherein each of the plurality of processor cores has a one-to-one relationship with a different locality-encoded, non-virtualized address range to a corresponding logical partition,
wherein at least one of a number of the plurality of processor cores, a size of each of the plurality of caches, or a size of each of the plurality of memories is selected to optimize a reverse-time-migration (RTM) computation, and wherein the number of cores is selected to saturate the off-chip memory bandwidth.

* * * * *